US012580204B2

(12) United States Patent     (10) Patent No.:   US 12,580,204 B2

Ramaswamy et al.     (45) Date of Patent:    Mar. 17, 2026

(54) FUEL CELL ELECTRODE AND FUEL CELL SYSTEM INCLUDING A FUNCTIONALIZED CARBON SUPPORT

(71) Applicant: GM GLOBAL TECHNOLOGY OPERATIONS LLC, Detroit, MI (US)

(72) Inventors: Nagappan Ramaswamy, Rochester Hills, MI (US); Venkata Raviteja Yarlagadda, South Lyon, MI (US); Nathan Mellott, Grand Blanc, MI (US); Swaminatha P. Kumaraguru, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 489 days.

(21) Appl. No.: 18/188,668

(22) Filed: Mar. 23, 2023

(65) Prior Publication Data

US 2024/0322191 A1    Sep. 26, 2024

(51) Int. Cl.

| | | |
|---|---|---|
| *H01M 4/92* | (2006.01) | |
| *H01M 4/88* | (2006.01) | |
| *H01M 8/10* | (2016.01) | |

(52) U.S. Cl.
CPC ......... *H01M 4/926* (2013.01); *H01M 4/8857* (2013.01); *H01M 4/8882* (2013.01); *H01M 2008/1095* (2013.01)

(58) Field of Classification Search
CPC .. H01M 4/8668; H01M 4/881; H01M 4/8828; H01M 4/8857; H01M 4/8882; H01M 4/926
See application file for complete search history.

(56) References Cited

U.S. PATENT DOCUMENTS

| | | | | |
|---|---|---|---|---|
| 2007/0238001 A1* | 10/2007 | Koyama | ................ | H01B 1/122 |
| | | | | 252/502 |
| 2015/0236354 A1* | 8/2015 | Binder | .................. | H01M 4/925 |
| | | | | 502/159 |

\* cited by examiner

*Primary Examiner* — Brittany L Raymond
(74) *Attorney, Agent, or Firm* — Quinn IP Law

(57) ABSTRACT

An electrode for a fuel cell system is provided. The electrode includes a carbon support. The carbon support includes carbon particles each functionalized with one or more sulfur and oxygen-containing moieties. Platinum-based catalyst particles are disposed on the carbon support. Ionomer is disposed on the carbon support. A weight ratio of the ionomer to the carbon support is about 0.4 or less.

20 Claims, 8 Drawing Sheets

FUEL CELL ELECTRODE AND FUEL CELL SYSTEM INCLUDING A FUNCTIONALIZED CARBON SUPPORT

INTRODUCTION

The disclosure generally relates to a fuel cell electrode and a fuel cell system including a carbon support that includes carbon particles functionalized with a sulfur and oxygen-containing moiety, and a method for making such a fuel cell electrode.

A fuel cell is an electrochemical device generally composed of multiple anode electrodes that receive hydrogen ($H_2$), multiple cathode electrodes that receive oxygen ($O_2$), and multiple fuel cell membranes (e.g., polymer electrolyte membranes (PEMs)) that include electrolytes or an electrolyte solution (e.g., ionomer) interposed between each anode and cathode. An electrochemical reaction is induced to oxidize hydrogen molecules at the anode to generate protons ($H^+$), which are then passed through the electrolyte for reduction at the cathode with an oxidizing agent, such as oxygen. This reaction creates electrons at the anode, some of which are redirected through a load, such as a vehicle's traction motor or a non-vehicular load requiring stationary power generation, before being sent to the cathode. Such a fuel cell can be used in combination with other fuel cells to form a fuel cell stack. This stack of fuel cells or fuel cell stack can be electrically connected to each other, for example, in series, such that the voltage supplied by each fuel cell is added to the next, such that a total voltage supplied by the fuel cell stack is the sum of the voltages of each of the stacked fuel cells.

Hybrid electric and fully electric (collectively "electric-drive") powertrains take on various architectures, some of which utilize a fuel cell system to supply power for one or more electric traction motors. One of the factors that determines the commercial viability of a fuel cell is its durability. A fuel cell for an automotive vehicle with an electric-drive powertrain may be tasked to provide at least 30,000 hours of service. Such high durability requirements may present a challenge to one or more of the fuel cell's membrane-electrode assembly (MEA) components, such as the catalyst layer(s) for one or both of the electrodes.

For example, within a perfluorosulfonic acid (PFSA) PEM membrane, the PFSA ionomer provides two important functions. Specifically, the ionomer provides a proton transport pathway between the two electrodes, and it also acts as a binder that affixes the catalyst to a carbon support and helps hold the carbon support together and to the surrounding electrode structure. Unfortunately, the fluorine-rich backbone structure and/or the sulfonate groups of the ionomer can be toxic to the catalyst and significantly decrease the catalytic activity of the catalyst layer(s) over time. Further, reducing the amounts of ionomer in current fuel cell systems to mitigate this issue, not only substantially increases resistance along the proton transport pathway but may also negatively impact binding or holding together of the carbon support structure.

SUMMARY

An electrode for a fuel cell system is provided. The electrode includes a carbon support that includes carbon particles each functionalized with one or more sulfur and oxygen-containing moieties. Platinum-based catalyst are particles disposed on the carbon support. Ionomer is disposed on the carbon support. A weight ratio of the ionomer to the carbon support is about 0.4 or less.

In some embodiments, the sulfur and oxygen-containing moieties include sulfate moieties and/or derivatives thereof.

In some embodiments, the sulfur and oxygen-containing moieties are chosen from sulfate moieties, sulfoxide moieties, sulfone moieties, sulfonic acid moieties, or combinations thereof.

In some embodiments, the carbon particles have a degree of functionalization of the sulfur and oxygen-containing moieties of from about 0.2 to about 0.8.

In some embodiments, the weight ratio of the ionomer to the carbon support is from about 0.2 to about 0.4.

In some embodiments, the weight ratio of the ionomer to the carbon support is about 0.2.

In some embodiments, the platinum-based catalyst particles include platinum metal or a platinum alloy.

In some embodiments, a catalyst layer includes the carbon support, the platinum-based catalyst particles, and the ionomer.

In some embodiments, the carbon support is formed entirely of the carbon particles that are functionalized with the one or more sulfur and oxygen-containing moieties and the platinum-based catalyst particles are dispersed on the carbon particles.

In some embodiments, the carbon support further includes additional carbon particles that are substantially free of any of the sulfur and oxygen-containing moieties. The platinum-based catalyst particles are dispersed on the additional carbon particles. The carbon particles that are functionalized with the one or more sulfur and oxygen-containing moieties are substantially free of any of the platinum-based catalyst particles.

In some embodiments, the electrode further includes a micro-porous substrate that is disposed adjacent to and supports the catalyst layer.

In some embodiments, the platinum-based catalyst particles are present in the catalyst layer in an amount of from about 30 to about 50 wt. %, based on a weight of the carbon support.

In some embodiments, the electrode is a cathode.

In some embodiments, the electrode is an anode.

According to an alternative embodiment, a fuel cell system includes a first electrode and a second electrode. The second electrode includes a carbon support that includes carbon particles each functionalized with one or more sulfur and oxygen-containing moieties. Platinum-based catalyst particles are disposed on the carbon support. Ionomer is disposed on the carbon support. A weight ratio of the ionomer to the carbon support is about 0.4 or less. A fuel cell membrane is disposed between the first and second electrodes.

According to an alternative embodiment, a method for making an electrode for a fuel cell system is provided. The method includes preparing an ionomer premix including an ionomer dispersed within a solvent. A catalyst-functionalized carbon premix is prepared. The catalyst-functionalized carbon premix includes platinum-based catalyst particles and carbon particles dispersed within additional solvent. The carbon particles are functionalized with one or more sulfur and oxygen-containing moieties. The ionomer premix and the catalyst-functionalized carbon premix are combined to form a catalyst ink having a weight ratio of the ionomer to the carbon particles of about 0.4 or less.

In some embodiments, the method further includes milling the catalyst ink to reduce an average particle size(s) of the platinum-based catalyst particles and/or the carbon particles.

In some embodiments, the method further includes casting the catalyst ink on a micro-porous substrate. The catalyst ink is dried to form a catalyst layer on the micro-porous substrate.

In some embodiments, preparing the catalyst-functionalized carbon premix includes combining the additional solvent and the carbon particles functionalized with the one or more sulfur and oxygen-containing moieties chosen from sulfate moieties, sulfoxide moieties, sulfone moieties, sulfonic acid moieties, or combinations thereof.

In some embodiments, combining includes forming the catalyst ink having the weight ratio of the ionomer to the carbon particles of from about 0.2 to about 0.4.

The above features and advantages and other features and advantages of the present disclosure are readily apparent from the following detailed description of the best modes for carrying out the disclosure when taken in connection with the accompanying drawings.

DETAILED DESCRIPTION

Figure 1:
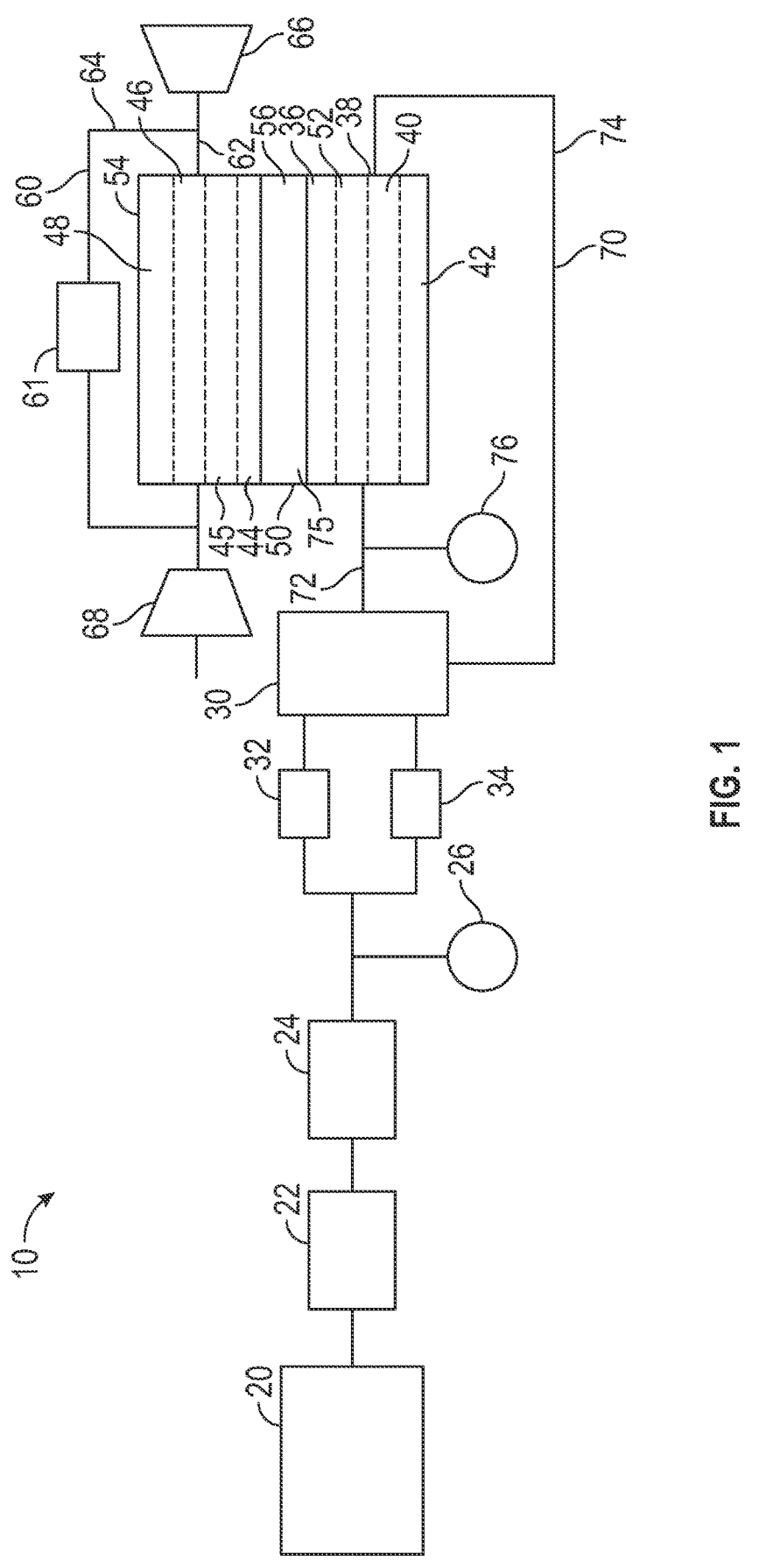
FIG. 1 schematically illustrates a fuel cell system including a fuel cell stack according to an embodiment of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The present disclosure relates to electrodes and fuel cell systems including a catalyst layer (also referred to herein as an electrode substrate) and methods for making such electrodes. In accordance with one or more embodiments of the disclosure, a fuel cell system includes a first electrode and a second electrode. The second electrode includes a carbon support that is functionalized. In particular, the carbon support includes or is otherwise formed of carbon particles that are functionalized with one or more sulfur and oxygen-containing moieties. That is, the carbon particles each contain at least one moiety or functional group that includes both sulfur and oxygen. In one or more embodiments, the one or more moieties include a sulfate moiety or moieties and/or derivatives thereof. Disposed on the carbon support are platinum-based catalyst particles and ionomer.

In one or more embodiments of the disclosure, it has been found that the functionalized carbon support including carbon particles that include the sulfur and oxygen-containing moiety advantageously decreases resistance of electrode proton transport between the electrodes compared to current fuel cell systems. As such, the ionomer can be significantly reduced without negatively impacting the electrode and fuel cell system performance. Further, it has been found that the functionalized carbon support reduces the amount of ionomer needed for binding or holding the carbon support together as well as to its surrounding electrode structure compared to current fuel cell systems. In one or more embodiments of the disclosure, a weight ratio of the ionomer to the carbon support in the electrode is about 0.4 or less, which represents about at least a 60 to 80% reduction of ionomer compared to other fuel cells electrodes. As will be discussed in further detail below, this significant reduction in the use of ionomer in the electrode enhances or otherwise improves the durability of the fuel cell system.

Referring now to the drawings, wherein like numerals indicate like parts in the several views, a fuel cell system including electrodes, and a method for making an electrode for a fuel cell system are shown and described herein. FIG. 1 is a schematic perspective view of a fuel cell system 10 according to an embodiment of the disclosure. As illustrated, the fuel cell system 10 includes a fuel cell stack 50, a hydrogen storage tank 20, a fuel injector 32 and a fuel injector 34 suppling flows of hydrogen gas to an ejector device 30. For simplicity, the fuel cell stack 50 is illustrated as a single fuel cell including a negative electrode (i.e., anode) 52 and a positive electrode (i.e., cathode) 54 separated by a fuel cell membrane 56 (or polymer electrolyte membrane (PEM)). However, it is to be understood that the fuel cell system 10 can include a plurality of fuel cell stacks 50 including a plurality of pairs of anodes 52 and cathodes 54.

As viewed in the drawing, the fuel cell membrane or PEM 56 is sandwiched or otherwise disposed between the anode 52 and the cathode 54. Proceeding outward from the PEM 56, the anode 52 includes a catalyst layer 36 (or anode substrate), a micro-porous layer (e.g., micro-porous substrate) 38, a gas diffusion layer 40 and a bipolar plate 42. Similarly, proceeding outward from the PEM 56, the cathode 54 includes a catalyst layer 44 (or cathode substrate), a micro-porous layer 45 (e.g., micro-porous substrate), a gas diffusion layer 46 and a bipolar plate 48. As used herein, the phrase "electrode substrate 36, 44" can refer to either the anode substrate, e.g., the catalyst layer 36 of the anode 52, or the cathode substrate, e.g., the catalyst layer 44 of the cathode 54.

An anode gas loop 70 including a hydrogen gas flow is provided to the anode 52. A cathode gas subsystem 60 including a compressed air flow is provided to the cathode 54. As described herein, the fuel cell stack 50 utilizes the hydrogen gas flow at the anode 52 and the compressed air at the cathode 54 to produce electrical energy for use by a vehicle or system equipped with the fuel cell stack 50.

Hydrogen gas is supplied by hydrogen storage tank 20 at high pressure. Shut-off valve 22 is provided and is capable of selectively permitting or not permitting hydrogen gas from the hydrogen storage tank 20 to flow to a remainder of the fuel cell system 10. Pressure regulator 24 is provided which controls and steps down the pressure of hydrogen gas from the high pressure delivered by hydrogen storage tank 20 to a medium pressure to be delivered to the fuel injector 32 and the fuel injector 34. A pressure sensor 26 is provided between the pressure regulator 24 and the two fuel injectors 32, 34.

The fuel injector 32 and the fuel injector 34 are operable to selectively open and supply hydrogen gas to the anode gas loop 70 and to selectively close and prohibit hydrogen gas from flowing into the anode gas loop 70. Hydrogen gas is delivered to the fuel injector 32 and the fuel injector 34 at medium pressure. The fuel injector 32 and the fuel injector 34 supply hydrogen gas to the anode gas loop 70 at a low pressure by cycling between an open state and a closed state, opening to increase pressure to a maximum desired anode gas loop pressure, closing when the pressure within the anode gas loop 70 reaches the maximum desired anode gas loop pressure, and opening again when the pressure within the anode gas loop 70 reaches a minimum desired anode gas loop pressure. By opening the fuel injector 32 and the fuel injector 34 when the pressure within the anode gas loop 70 reaches the minimum desired anode gas loop pressure and by closing the fuel injector 32 and the fuel injector 34 when the pressure within the anode gas loop 70 reaches the maximum desired anode gas loop pressure, the fuel injector 32 and the fuel injector 34 may be used to maintain the pressure within the anode gas loop 70 within a desired low pressure range.

The ejector device 30 is a device useful to provide hydrogen gas from the fuel injector 32 and from the fuel injector 34 into the anode gas loop 70. The ejector device 30 includes a venturi configuration. Hydrogen gas flowing through the ejector device 30 flows past a venturi tube within the ejector device 30. The anode gas loop 70 includes an upstream portion 72 upstream of the anode 52 and a downstream portion 74 downstream of the anode 52. The upstream portion 72 includes a high concentration of hydrogen gas. As the hydrogen gas goes through the anode 52, a significant portion of the hydrogen gas may be consumed by the anode 52. However, a lower concentration of hydrogen gas may remain in the downstream portion 74. The downstream portion 74 is connected to the venturi tube of the ejector device 30, such that the movement of hydrogen gas from the fuel injector 32 and the fuel injector 34, through the ejector device 30, and into the upstream portion 72 flows past the venturi device and draws gas from the downstream portion 74 into the gas flowing into the upstream portion 72. In this way, gas from the downstream portion 74 is recycled through the anode 52. A pressure sensor 76 is disposed to monitor a pressure within the upstream portion 72.

Water as a by-product of the chemical reaction of the fuel cell stack 50 may exit the anode 52. The downstream portion 74 may include an anode water separator and an anode drain valve useful to drain the water from the downstream portion 74.

Air is provided to the cathode 54 to supply oxygen for the fuel cell stack reaction. An air compressor 66 is provided drawing in ambient air and providing a pressurized flow of air through a cathode gas subsystem 60. The cathode gas subsystem 60 includes a cathode reactant portion 62 and a cathode bypass portion 64. The cathode reactant portion 62 provides a flow of air to the cathode 54. A bypass valve 61 is connected to the cathode bypass portion 64, and control of the bypass valve 61 may be used to control how much air flows through the cathode bypass portion 64 and how much air flows through the cathode reactant portion 62. This control of how much air flows through the cathode reactant portion 62 may be important to controlling the reaction of the fuel cell stack 50. Air exits through an air expander device 68.

During operation of the fuel cell stack 50, as briefly mentioned above, hydrogen gas enters channels formed in the anode bipolar plate 42 and flow across the anode gas diffusion layer 40, the micro-porous layer 38, and the catalyst layer 36. Likewise, oxygen or air enters channels formed in the cathode bipolar plate 48 and flow across the cathode gas diffusion layer 46, the micro-porous layer 45, and the catalyst layer 44. As the hydrogen gas that enters the anode layers is oxidized, the hydrogen atoms' electrons are stripped off and flow in an electrical circuit, for example through a load (not shown), from the anode bipolar plate 42 to the cathode bipolar plate 48. Meanwhile, the remaining portions of the oxidized hydrogen atoms (i.e., their nuclei, which are protons) are transported across the fuel cell stack 50 from the anode 52 side to the cathode 54 side, where they combine with some of the incoming air and the anode-derived electrons which were introduced to the electrical circuit.

Figure 2:
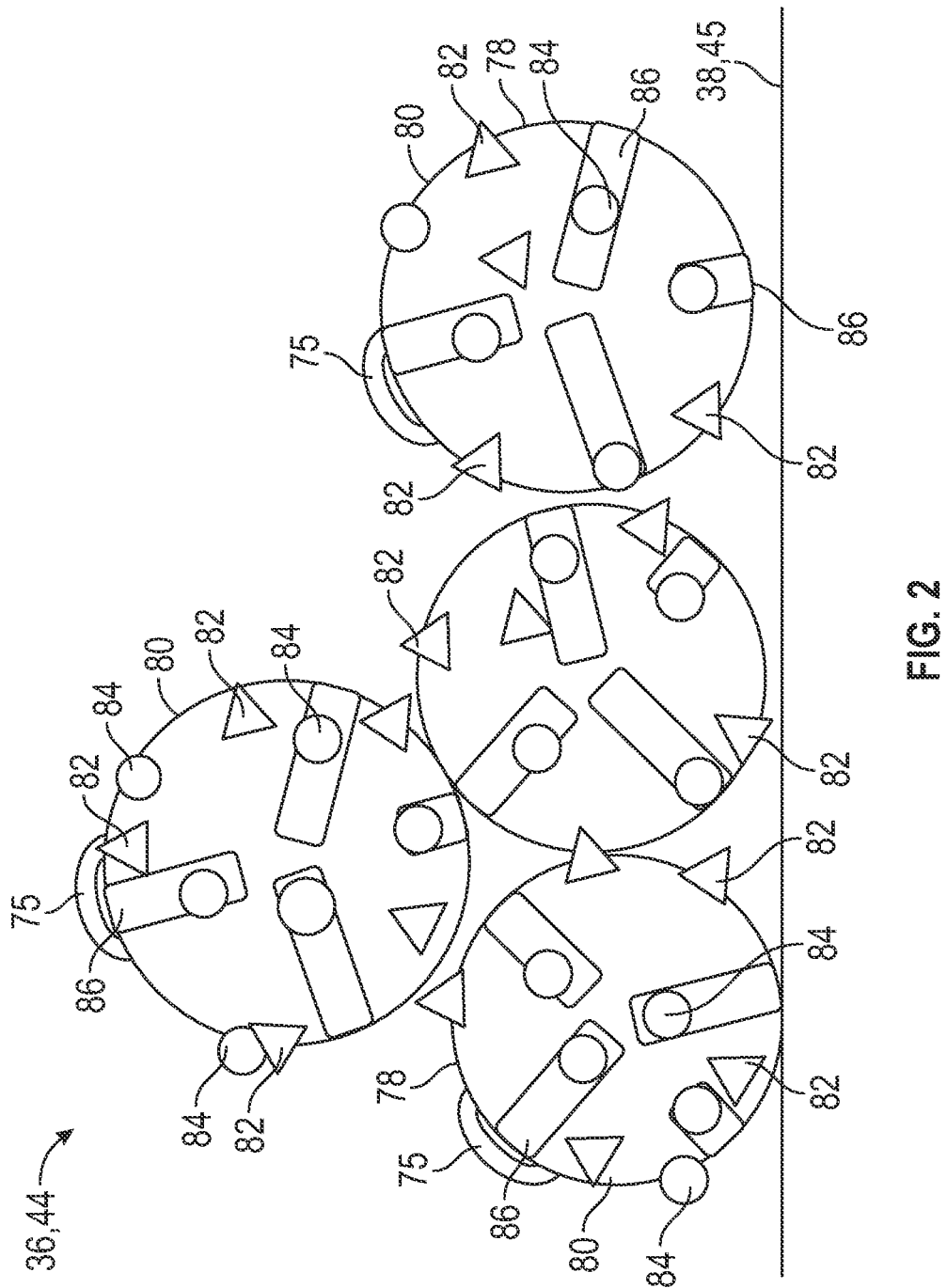
FIG. 2 schematically illustrates a portion of an electrode of the fuel cell stack depicted in FIG. 1 including a functionalized carbon support according to an embodiment of the disclosure.

FIG. 2 schematically illustrates the electrode substrate 36, 44, e.g., the catalyst layer 36, 44 of either the anode 52 or the cathode 54 of the fuel cell stack 50. Referring to FIGS. 1-2, in one or more embodiments of the disclosure, the fuel cell stack 50 includes ionomer 75 that provides a proton transfer pathway between the anode 52 and the cathode 54. In one example, the ionomer is perfluorosulfonic acid (PFSA) and is present in the fuel cell membrane 56 and, as will be discussed in further detail below, to a lesser extent compared to current fuel cells, on the anode 52 and/or on the cathode 54.

With regard to the anode 52 and/or the cathode 54, the electrode(s) 52, 54 include the electrode substrate 36, 44 that is disposed adjacent to and is supported by the micro-porous substrate 38, 45. The electrode substrate 36, 44 includes a carbon support 78. As illustrated, the carbon support 78 is a functionalized carbon support that includes carbon particles 80 each functionalized with one or more sulfur and oxygen-containing moieties 82. In an exemplary embodiment, the sulfur and oxygen-containing moieties 82 are covalently bonded to the carbon particles 80 and include sulfate moieties and/or derivatives thereof. In one or more embodiments of the disclosure, the sulfur and oxygen-containing moieties 82 are chosen from sulfate moieties, sulfoxide moieties, sulfone moieties, and/or sulfonic acid moieties. In an exemplary embodiment, the carbon particles 80 have a degree of functionalization of the sulfur and oxygen-containing moieties 82 of from about 0.2 to about 0.8.

In one or more embodiments, the carbon particles 80 having an average particle size of from about 50 to about 600 nm. In an embodiment of the disclosure, the carbon particles 80 have a plurality of pores 86 formed therein with an average pore diameter of from about 2 to about 50 nm.

The electrode substrate 36, 44 further includes platinum-based catalyst particles 84 that are dispersed or otherwise disposed on the carbon support 78. In one or more embodiments of the disclosure, the platinum-based catalyst particles 84 are formed of a platinum-based material such as platinum (Pt) metal and/or a platinum alloy, for example a Pt-based alloy that further includes cobalt (Co) and/or nickel (Ni) and/or other alloying elements. In an embodiment, the platinum-based catalyst particles 84 our nanoparticles having an average particle size of from about 1.5 to about 5.0 nm. In an exemplary embodiment, the platinum-based catalyst particles 84 are present in an amount of from about 30 to about 50 wt. %, based on a weight of the electrode substrate 36, 44.

As illustrated, the ionomer 75 is disposed on the carbon support 78 including discontinuously or intermittently in the carbon particles 80. The ionomer 75 helps bind the carbon particles 80 and the platinum-based catalyst particles 84 together as well as to the micro-porous substrate 38, 45. As discussed above, in an exemplary embodiment, it has been found that the functionalized carbon particles 80 allow for a reduction in the amount of ionomer 75 used for binding. In one or more embodiments of the disclosure, a weight ratio of the ionomer to the carbon support is about 0.4 or less, such as from about 0.2 to about 0.4, for example about 0.2.

Figure 3:
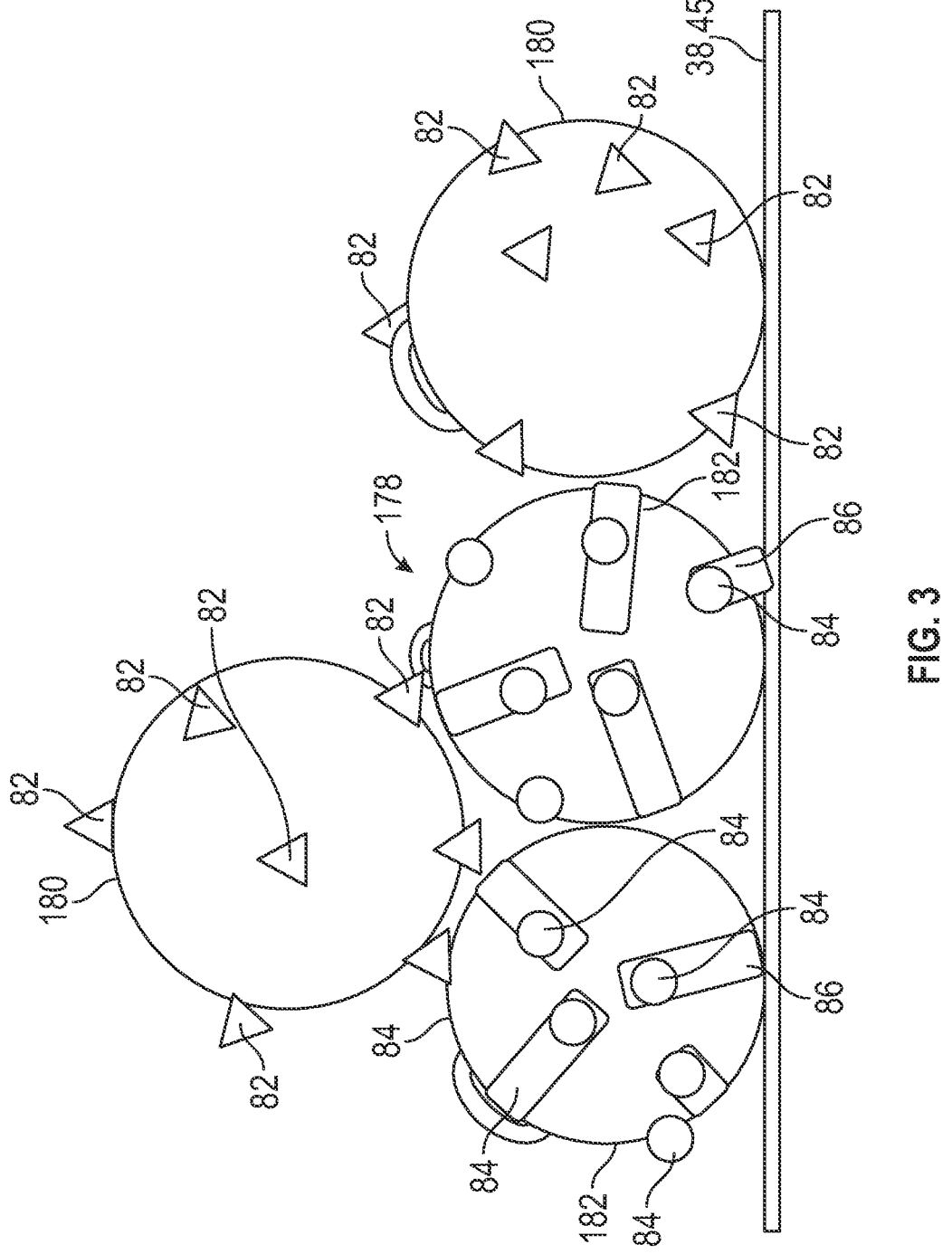
FIG. 3 schematically illustrates a portion of an electrode of the fuel cell stack depicted in FIG. 1 including a functionalized carbon support according to another embodiment of the disclosure.

As illustrated in FIG. 2, the carbon support 78 is formed entirely of the carbon particles 80 that are functionalized with the sulfur and oxygen-containing moieties 82 and the platinum-based catalyst particles are dispersed on these functionalized carbon particles 80. In another embodiment and with reference to FIG. 3, a carbon support 178 disposed adjacent to and supported by the micro-porous layer 38, 45 is provided. The carbon support 178 includes a first plurality of carbon particles 180 each functionalized with the one or more sulfur and oxygen-containing moieties 82 as discussed above and a second plurality of carbon particles 182 that are substantially free of any of the sulfur and oxygen-containing moieties 82. As illustrated, the platinum-based catalyst particles 84, as described above, are dispersed on the second plurality of carbon particles 182 while the first plurality of carbon particles 180 are substantially free of any of the platinum-based catalyst particles 84. As such, the carbon support 178 is functionalized by the presence of the first plurality of carbon particles 180 and advantageously decreases resistance of electrode proton transport and allows for the reduction in the amount of ionomer needed for binding or holding the carbon support 178 together as discussed above in relation to the carbon support 78. In one or more embodiments of the disclosure, a weight ratio of the ionomer to the carbon support 178 is about 0.4 or less, such as from about 0.2 to about 0.4, for example about 0.2. In an exemplary embodiment, a weight ratio of the first plurality of carbon particles 180 to the second plurality of carbon particles 182 is from about 0.05 to about 0.5, for example from about 0.05 to about 0.2.

Figure 4:
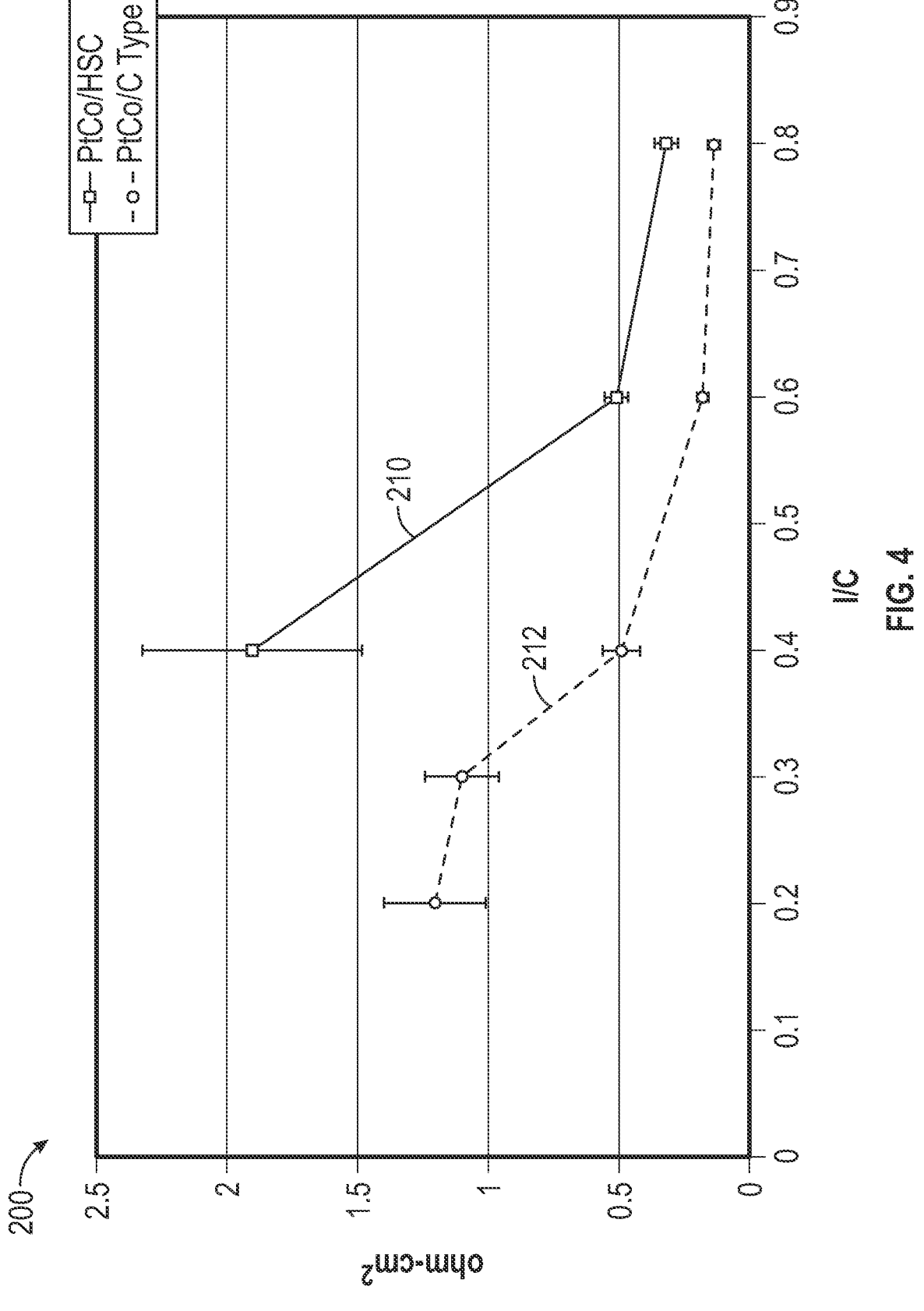
FIG. 4 graphically illustrates electrode proton transport resistance as a function of a weight ratio of ionomer to carbon for both an electrode with a baseline catalyst layer and an electrode with an exemplary functionalized carbon support according to an embodiment of the disclosure.

Referring to FIG. 4, graph 200 is illustrated including a vertical axis illustrating electrode proton transport resistance at 50% relative humidity in Ohm-centimeter^2 and a horizontal axis illustrating ionomer to carbon ratio (I/C). Illustrated are two different samples: sample 210, an initial comparative baseline sample without any sulfate functionality; and sample 212, an initial sample including the exemplary functionalized carbon support according to an embodiment of the disclosure. Comparing samples 210 and 212, as the ionomer to carbon ratio decreases, the proton transport resistance increases significantly more for sample 210 versus sample 212 indicating a more rapidly decreasing pathway for proton transfer for the baseline sample. Further, for sample 210, below 0.4 ionomer to carbon ratio, the electrode cannot be adequately coated with the ionomer for binding, indicating that the carbon support may crack or otherwise fall apart at lower ionomer to carbon ratios. For sample 212, the electrode can be adequately coated with the ionomer down to a relatively low ionomer to carbon ratio of 0.2 for improved binding of the carbon support compared to sample 210.

Figure 5:
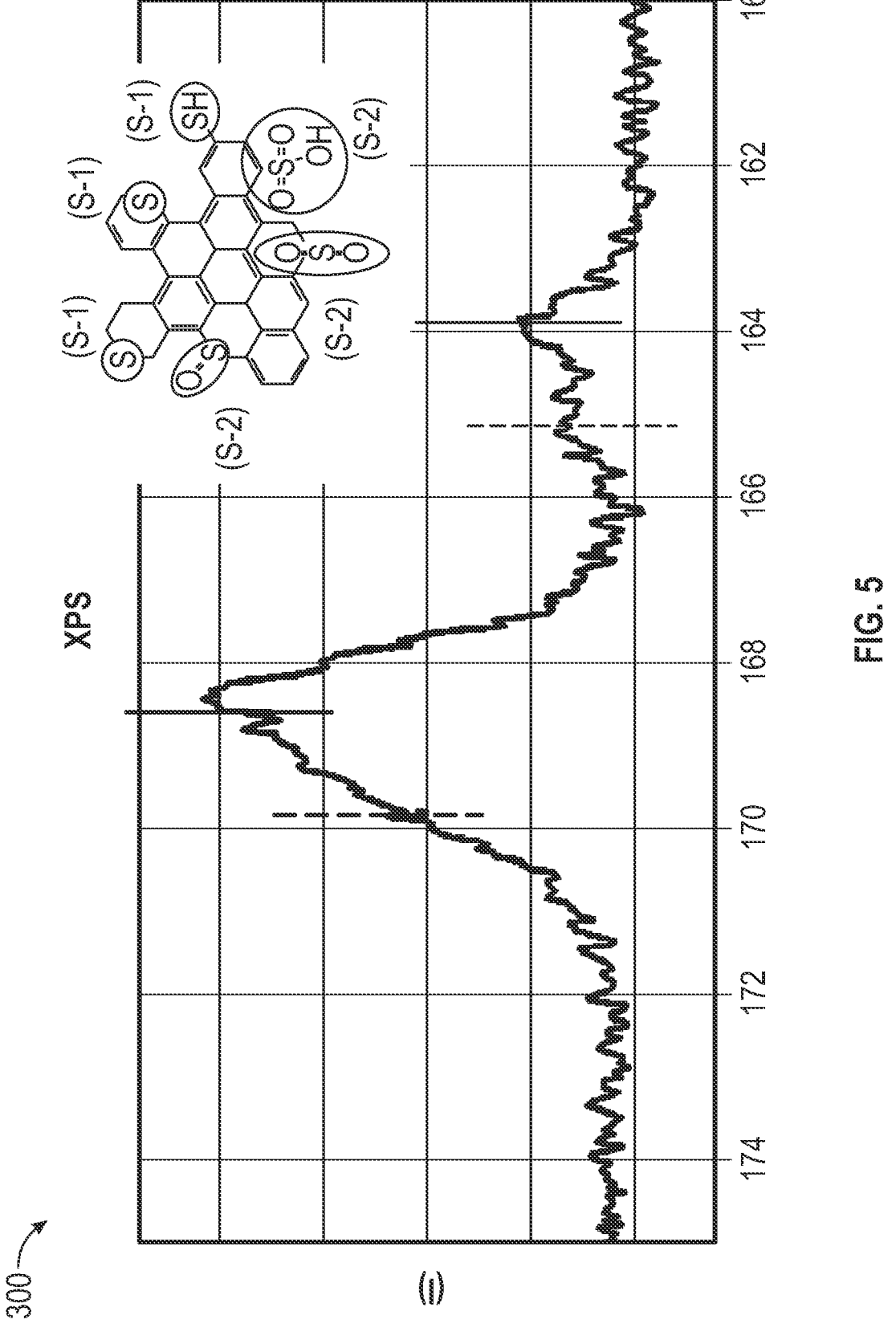
FIG. 5 is a spectrograph generated from an X-ray Photoelectron Spectrometer (XPS) of a functionalized carbon support according to an embodiment of the disclosure.
Figure 6:
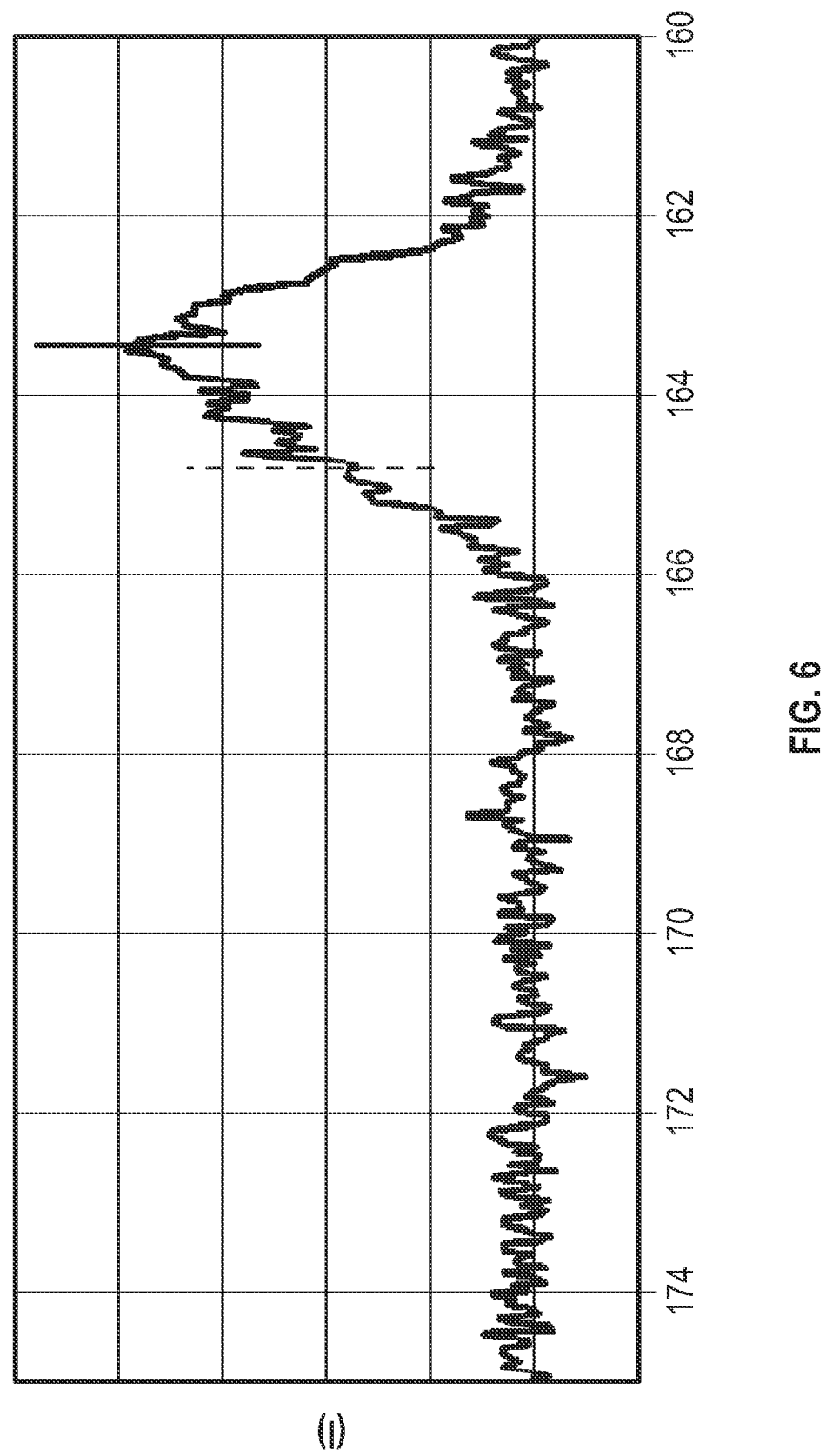
FIG. 6 is a spectrograph generated from an X-ray Photoelectron Spectrometer (XPS) of a baseline carbon support according to an embodiment of the disclosure.

Referring to FIGS. 5 and 6, graphs 300 and 350 are sulfur profile spectrographs generated from an X-ray Photoelectron Spectrometer (XPS) of a functionalized carbon support according to an embodiment of the disclosure and a baseline carbon support without any sulfate functionality, respectively. A vertical axis illustrates X-ray absorption intensity, and a horizontal axis illustrates wavenumber. An X-ray absorption intensity at wavenumbers of about 163.8 and about 165.2 indicate the presence of thioether, thiophene, and thiol sulfur functionality (designated as "S-1"). An X-ray absorption intensity at wavenumbers of about 168.4 and about 169.8 indicate the presence of sulfoxide, sulfone and sulfonic acid sulfur functionality (designated as "S-2"). It has been found that the "S-1" sulfur functional groups are not capable of transporting protons, while the "S-2" sulfur functional groups provide enhanced conduction or transport of protons. The functionalized carbon support illustrated in graph 300 indicates the presence of the "S-2" sulfur functional groups, thereby providing enhanced transport capability of protons, while the baseline carbon support illustrated in graph 350 only contained the "S-1" sulfur functional groups. Therefore, comparing the functionalized carbon support to the baseline carbon support, one may find that the functionalized carbon support has significantly improved transport capability of protons over the baseline carbon support.

Figure 7:
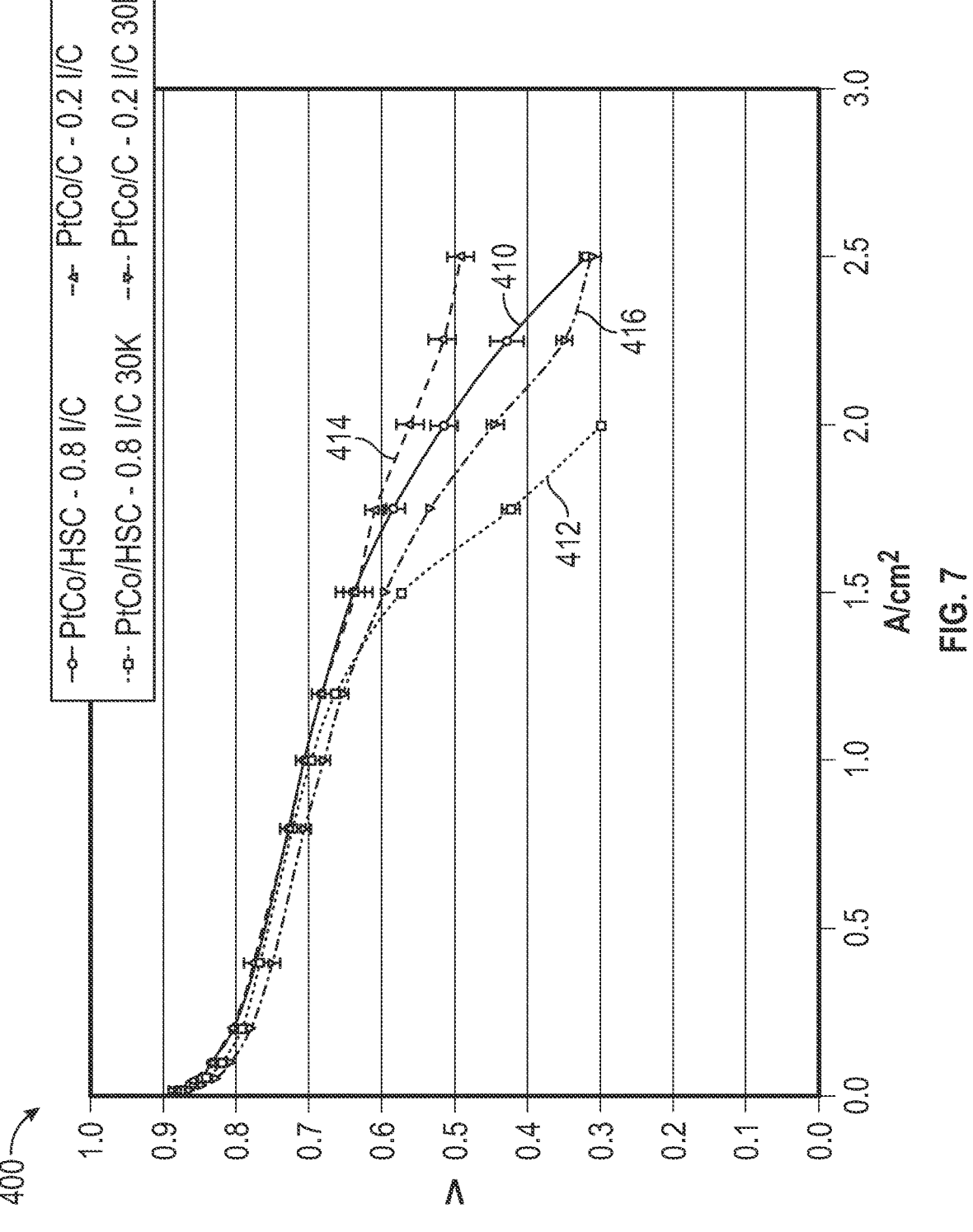
FIG. 7 graphically illustrates hydrogen/air polarization curves of fuel cell voltage as a function of current density at beginning of life (BOL) and end of test (EOT) for both a baseline fuel cell including an electrode with a baseline catalyst layer and a fuel cell including an electrode with an exemplary functionalized carbon support according to an embodiment of the disclosure.

FIG. 7 graphically illustrates hydrogen/air polarization curves of fuel cell voltage as a function of current density at beginning of life (BOL) and after cyclic testing (i.e., end of test (EOT)) for both a baseline fuel cell including a cathode with a baseline catalyst layer without any sulfate functionality and a fuel cell including a cathode with an exemplary functionalized carbon support according to an embodiment of the disclosure. Graph 400 is illustrated including a vertical axis illustrating cell voltage in volts (V) and a horizontal axis illustrating current density in Amperes/(centimeter)^2. Four different samples were tested: sample 410, an initial comparative baseline sample with an ionomer to carbon ratio of 0.8; sample 412, the comparative baseline sample with an ionomer to carbon ratio of 0.8 after the cycling test; sample 414, the initial sample including the exemplary functionalized carbon support with an ionomer to carbon ratio of 0.2; and sample 416, the sample including the exemplary functionalized carbon support with an ionomer to carbon ratio of 0.2 after the cycling test. Comparing samples 410 and 412, one may see substantial degradation of the fuel cell voltage after the cycling test. Comparing samples 414 and 416, one may see significantly less degradation of the fuel cell voltage after the cycling test. Further, comparing samples 414 and 416 to samples 410 and 412, one may see an overall substantial improvement of the fuel cell voltage as a function of current density. The exemplary functionalized carbon support improved durability and performance of the electrode substrate by providing excellent fuel cell voltage as a function of current density retention.

Figure 8:
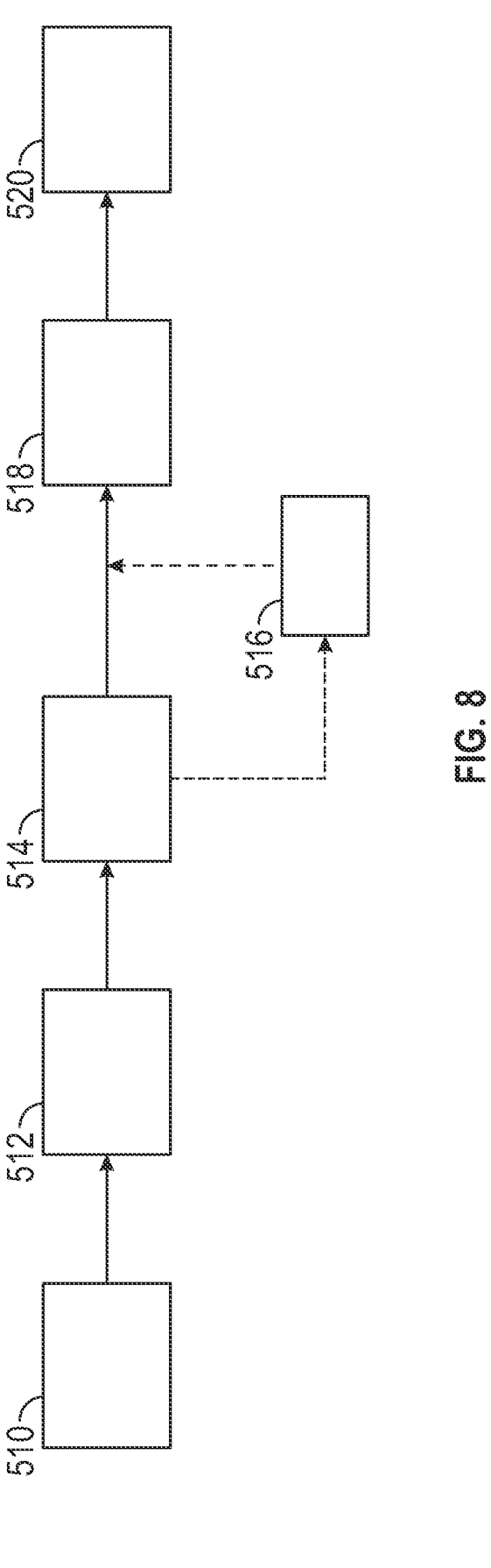
FIG. 8 is a flowchart of a method for making an electrode for a fuel cell system according to one or more embodiments of the disclosure.

Referring to FIG. 8, a method 500 for making an electrode for a fuel cell is provided. In particular, the method 500 includes preparing (STEP 510) an ionomer premix including an ionomer dispersed within a solvent. Examples of solvents include water, alcohol, or the like. Non-limiting examples of alcohol include methyl alcohol, ethyl alcohol, and/or n-propanol.

The method 500 continues by preparing (STEP 512) a catalyst-functionalized carbon premix including platinum-based catalyst particles and carbon particles dispersed within additional solvent (e.g., water, alcohol or the like). The carbon particles are functionalized with one or more sulfur and oxygen-containing moieties as described herein.

The method 500 continues by combining (STEP 514) the ionomer premix and the catalyst-functionalized carbon premix to form a catalyst ink having a weight ratio of the ionomer to the carbon particles of about 0.4 or less. Optionally, the catalyst ink is milled (STEP 516) to reduce an average particle size(s) of the platinum-based catalyst particles and/or the carbon particles. In some embodiments, the catalyst ink is ball milled for about 24 hours or until the average particle size, as measured by Dynamic Light Scattering, is reduced to less than about 2 μm.

The method 500 continues by casting (STEP 518) the catalyst ink on a micro-porous substrate. The catalyst ink is then dried (STEP 520) to form a catalyst layer on the micro-porous substrate. In one or more embodiments of the disclosure, the catalyst layer is then dried, for example in an oven, at a temperature of about 60° C. or about 15 minutes to remove all or substantially all of the solvent(s) used in the coating process.

While the best modes for carrying out the disclosure have been described in detail, those familiar with the art to which this disclosure relates will recognize various alternative designs and embodiments for practicing the disclosure within the scope of the appended claims.

What is claimed is:

1. An electrode for a fuel cell system, the electrode comprising:
   a carbon support comprising:
      a first plurality of carbon particles each functionalized with one or more sulfur and oxygen-containing moieties; and
      a second plurality of carbon particles that are substantially free of any of the one or more sulfur and oxygen-containing moieties;
   platinum-based catalyst particles disposed on the second plurality of carbon particles;
   wherein the first plurality of carbon particles that are functionalized are substantially free of any of the platinum-based catalyst particles;
   ionomer disposed on the carbon support, wherein a weight ratio of the ionomer to the carbon support is from about 0.2 to about 0.4; and
   a micro-porous substrate that is disposed adjacent to and supports a catalyst layer comprising the carbon support, the platinum-based catalyst particles, and the ionomer.

2. The electrode of claim 1, wherein the sulfur and oxygen-containing moieties include sulfate moieties and/or derivatives thereof.

3. The electrode of claim 1, wherein the sulfur and oxygen-containing moieties are chosen from sulfate moieties, sulfoxide moieties, sulfone moieties, sulfonic acid moieties, or combinations thereof.

4. The electrode of claim 1, wherein the first plurality of carbon particles have a degree of functionalization of the sulfur and oxygen-containing moieties of from about 0.2 to about 0.8.

5. The electrode of claim 1, wherein the weight ratio of the ionomer to the carbon support is about 0.2.

6. The electrode of claim 1, wherein the platinum-based catalyst particles comprise platinum metal or a platinum alloy.

7. The electrode of claim 1, wherein the platinum-based catalyst particles are present in the catalyst layer in an amount of from about 30 wt. % to about 50 wt. %, based on a weight of the carbon support.

8. The electrode of claim 1, wherein the electrode is a cathode.

9. The electrode of claim 1, wherein the electrode is an anode.

10. The electrode of claim 1, wherein the one or more sulfur and oxygen-containing moieties comprise sulfoxide, sulfone, or sulfonic acid functionality that exhibits X-ray photoelectron spectroscopy (XPS) absorption intensity peaks at wavenumbers of about 168.4 nm and about 169.8 nm.

11. The electrode of claim 1, wherein the electrode exhibits a proton transport resistance at 50% relative humidity that is at least 60% lower than a comparative electrode having non-functionalized carbon particles at the same weight ratio of ionomer to carbon support.

12. A fuel cell system comprising:
   a first electrode;
   a second electrode comprising:
      a carbon support comprising:
         a first plurality of carbon particles each functionalized with one or more sulfur and oxygen-containing moieties; and
         a second plurality of carbon particles that are substantially free of any of the one or more sulfur and oxygen-containing moieties;
      platinum-based catalyst particles disposed on the second plurality of carbon particles;
      wherein the first plurality of carbon particles that are functionalized are substantially free of any of the platinum-based catalyst particles;
      ionomer disposed on the carbon support, wherein a weight ratio of the ionomer to the carbon support is from about 0.2 about 0.4; and
      a micro-porous substrate that is disposed adjacent to and supports a catalyst layer comprising the carbon support, the platinum-based catalyst particles, and the ionomer; and
   a fuel cell membrane disposed between the first and second electrodes.

13. The fuel cell system of claim 12, wherein the ratio of the ionomer to the carbon support is about 0.2.

14. The fuel cell system of claim 12, wherein the one or more sulfur and oxygen-containing moieties comprise sulfoxide, sulfone, or sulfonic acid functionality that exhibits X-ray photoelectron spectroscopy (XPS) absorption intensity peaks at wavenumbers of about 168.4 nm and about 169.8 nm.

15. The fuel cell system of claim 12, wherein the second electrode exhibits a proton transport resistance at 50% relative humidity that is at least 60% lower than a comparative electrode having non-functionalized carbon particles at the same weight ratio of ionomer to carbon support.

16. A method for making an electrode for a fuel cell system, the method comprising:

preparing an ionomer premix comprising an ionomer dispersed within a solvent;

preparing a catalyst-functionalized carbon premix dispersed within additional solvent, the catalyst-functionalized carbon premix comprising:

platinum-based catalyst particles;

a first plurality of carbon particles each functionalized with one or more sulfur and oxygen-containing moieties; and a second plurality of carbon particles that are substantially free of any of the one or more sulfur and oxygen-containing moieties;

wherein the platinum-based catalyst particles are disposed on the second plurality of carbon particles;

wherein the first plurality of carbon particles that are functionalized are substantially free of any of the platinum-based catalyst particles; and combining the ionomer premix and the catalyst-functionalized carbon premix to form a catalyst ink having a weight ratio of the ionomer to the first plurality and second plurality of carbon particles of from about 0.2 to about 0.4.

17. The method of claim 16, further comprising milling the catalyst ink to reduce an average particle size(s) of the platinum-based catalyst particles and/or the first plurality of carbon particles and/or the second plurality of carbon particles.

18. The method of claim 16, further comprising:

casting the catalyst ink on a micro-porous substrate; and drying the catalyst ink to form a catalyst layer on the micro-porous substrate;

wherein the catalyst layer comprises the platinum-based catalyst particles and the ionomer;

wherein the micro-porous substrate is disposed adjacent to and supports the catalyst layer.

19. The method of claim 16, wherein preparing the catalyst-functionalized carbon premix comprises combining the additional solvent and the first plurality of carbon particles functionalized with the one or more sulfur and oxygen-containing moieties chosen from sulfate moieties, sulfoxide moieties, sulfone moieties, sulfonic acid moieties, or combinations thereof.

20. The method of claim 16, wherein combining comprises forming the catalyst ink having the weight ratio of the ionomer to the first plurality and second plurality of carbon particles of about 0.2.

* * * * *